(No Model.)

J. R. ELLIOTT.
Combined Horse Muzzle and Poke.

No. 239,746.    Patented April 5, 1881.

Witnesses.
A. Ruppert,
D. P. Cowl

J. R. Elliott
Inventor.
D. P. Holloway & Co
Att'ys.

UNITED STATES PATENT OFFICE.

JOHN R. ELLIOTT, OF CALHOUN, KENTUCKY.

COMBINED HORSE MUZZLE AND POKE.

SPECIFICATION forming part of Letters Patent No. 239,746, dated April 5, 1881.

Application filed April 9, 1880. (No model.)

*To all whom it may concern:*

Be it known that I, JOHN R. ELLIOTT, of Calhoun, in the county of McLean and State of Kentucky, have invented certain new and useful Improvements in Muzzles; and I do hereby declare that the following is a full, clear, and exact description of the invention, which will enable others skilled in the art to which it appertains to make and use the same, reference being had to the accompanying drawings, and to letters of reference marked thereon, which form a part of this specification—

Figure 1:
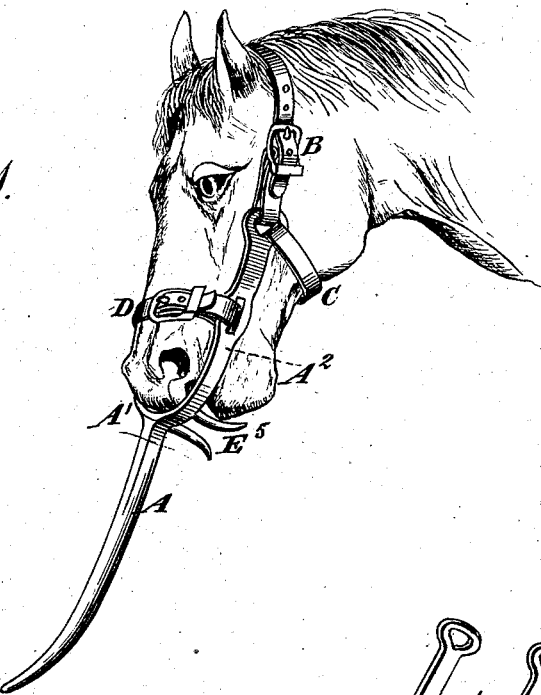
Figure 2:
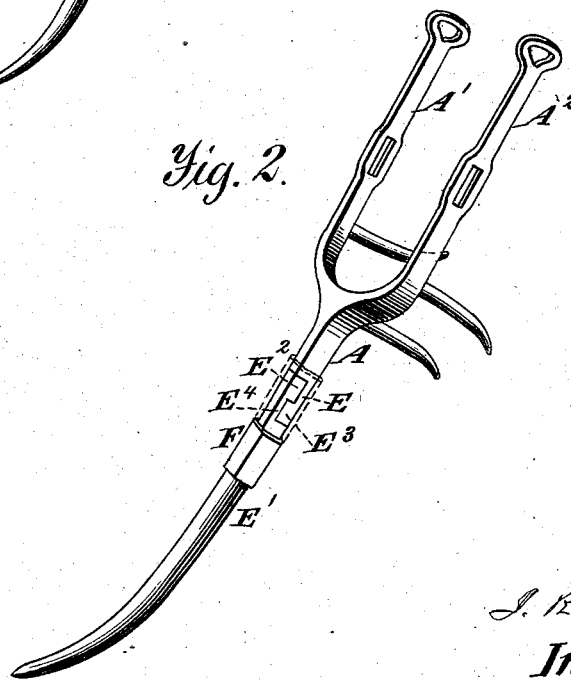

Figure 1 being a perspective view of my improvement, showing its application to the head of a horse, with the necessary straps for securing it thereto, the projecting points for preventing the animal from cropping corn or other substances while wearing the muzzle, and a projecting bar for preventing animals from jumping fences; and Fig. 2 is a perspective view of the muzzle with the straps or headstall removed, and showing, also, a jointed extension for preventing animals from jumping fences.

Corresponding letters denote like parts in both of the figures.

This invention relates to a muzzle to be worn by horses while being used in the cultivation of corn and other crops, but which is also applicable to other animals for the same purpose, and also for preventing horses and horned animals from jumping fences, or from destroying shrubbery and other products, my object being to provide a convenient apparatus to be worn on the heads of animals while being used among crops for the cultivation of the same, and also to prevent animals, when turned out for exercise or for other purposes, from destroying valuable shrubs or plants, and also to prevent their escape from any inclosure in which they may be placed; and to this end my invention consists in combining with any suitable headstall adapted to be secured upon the heads of animals a metallic bifurcated bar having upon it downwardly-projecting arms, which may be of sufficient length to prevent the animal from cropping grass or other substances, they being, by preference, curved backward or upward, so as to project under the under jaw of the animal, and thus prevent it from opening its mouth while wearing the devices; and it further consists in attaching to the lower portion of the metallic part an extension-bar for preventing animals from jumping fences, as will be more fully explained hereinafter.

In constructing muzzles of this type I use a bifurcated bar, A, preferably of metal, the branched parts $A'$ $A^2$ of which extend from just below the lips of the animal up upon either side of its head sufficiently far to receive through apertures in their ends, or through rings placed therein, a strap, B, which passes over the head and is provided with a buckle for regulating its length, as shown in Fig. 1 of the drawings.

From the points where the strap B joins the ends of the branched parts $A'$ $A^2$ there extends a strap, C, which passes under the lower jaw of the animal, it being supplied with a buckle for regulating its length, its purpose being to aid in holding the headstall upon the animal.

Below the points where the straps B and C are attached slots are formed, or other means provided for attaching to the parts $A'$ $A^2$ still another strap, D, which is also supplied with a buckle, by which its length can be regulated, it passing over the upper jaw, and thus completing the means of securing the muzzle to the animal.

To the under surface of the muzzle, and to the metallic portion thereof, projecting arms $E^5$ are secured or formed thereon, which may be of sufficient length to prevent the animal from getting its mouth so near the ground as to enable it to crop grass, but which I prefer to curve rearward, so as to cause them to extend under the lower jaw of the animal, and thus prevent it, while wearing the device, from opening its mouth sufficiently wide to enable it to crop corn or other crops while being used in the cultivation thereof.

When the muzzle is used for the purposes above described it is necessary that the bar A should extend but a short distance below the point where the parts $A'$ $A^2$ branch from it; but when it is to be used to prevent animals from jumping fences it should extend far enough below that point to admit of there being attached to it an extension-bar, as shown in Fig. 2. The method of attaching this extension is as follows: Near the lower end of bar A a recess, E, is formed, which receives a projection formed upon the upper end of the extension E', said projection being shown at E² as resting in recess E of the bar A. Upon the lower end of bar A there is a projection, E³, which rests in a recess, E⁴, of the extension E', all of which make a lock-joint between the parts E' and A, which, when covered with a sliding band, F, (shown in Fig. 2,) constitutes a ready and permanent method of connecting and disconnecting the parts E' and A, and thus the animal may be relieved from carrying the additional weight of the former when being worked, and an effectual barrier be provided against the jumping of fences, when the animal is running at large, by simply connecting the parts.

Any other convenient method may be adopted for connecting the extension to the part A, as I do not limit my invention to the form of joint used.

I am aware that, broadly considered, muzzles for preventing animals from feeding at certain times and from injuring crops while being used in their cultivation are not novel. I do not therefore make a claim to such devices, however constructed; but,

Having thus described my improvements, what I do claim, and desire to secure by Letters Patent, is—

1. In combination with a headstall to be worn by animals, a bar made of metal or other suitable material, adapted to be connected to the headstall, and having upon its under surface one or more projecting curved arms, for preventing the animal from cropping corn and other substances while passing through or among them, substantially as set forth.

2. In combination with a muzzle for preventing animals from eating at certain times, the removable extension-bar E', it being constructed and arranged for operation substantially as set forth.

In testimony that I claim the foregoing as my own I affix my signature in presence of two witnesses.

JOHN R. ELLIOTT.

Witnesses:
WALTER A. RAFFERTY,
JOHN E. LUCKETT.